(12) United States Patent
Oukassi et al.

(10) Patent No.: US 8,389,138 B2
(45) Date of Patent: Mar. 5, 2013

(54) METHOD OF OPERATING A NON-BALANCED LITHIUM-ION MICROBATTERY

(75) Inventors: Sami Oukassi, Saint-Egreve (FR); Frédéric Le Cras, Notre-Dame-de-l'Osier (FR); Steve Martin, Saint-Sauveur (FR); Raphael Salot, Lans-en-Vercors (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 428 days.

(21) Appl. No.: 12/818,708

(22) Filed: Jun. 18, 2010

(65) Prior Publication Data

US 2010/0330401 A1  Dec. 30, 2010

(30) Foreign Application Priority Data

Jun. 29, 2009 (FR) .................... 09 03159

(51) Int. Cl.
*H01M 10/44* (2006.01)
(52) U.S. Cl. .......................................... 429/50
(58) Field of Classification Search ........... 429/50, 429/52
See application file for complete search history.

(56) References Cited

U.S. PATENT DOCUMENTS 6,168,884 B1 * 1/2001 Neudecker et al. ........... 429/162
6,800,397 B2 * 10/2004 Okada ..................... 429/231.95
2004/0259000 A1 * 12/2004 Adachi et al. ............... 429/306
2007/0015060 A1 1/2007 Klaassen
2009/0291353 A1 * 11/2009 Affinito et al. .................. 429/50
2010/0255362 A1 * 10/2010 Ogawa et al. ................ 429/145

FOREIGN PATENT DOCUMENTS

EP  2 071 657 A1  6/2009
JP  A-2004-127743  4/2004
WO  WO 00/60689  10/2000

OTHER PUBLICATIONS

B.J. Neudecker, et al., "Lithium-Free Thin-Film Battery with in Situ Plated Li Anode," *Journal of the Electrochemical Society*, 2000, pp. 517-523, vol. 147, No. 2.
Y.J. Park, et al., "Characterization of Tin Oxide/$LiMn_2O_4$ Thin-Film Cell," *Journal of Power Sources*, 2000, pp. 250-254, vol. 88.

* cited by examiner

*Primary Examiner* — Carlos Barcena
(74) *Attorney, Agent, or Firm* — Oliff & Berridge, PLC

(57) ABSTRACT

The lithium-ion microbattery comprises a positive electrode having a first $Li^+$ ion storage capacity and a first thickness made from a first lithium insertion material, an electrolyte and a negative electrode having a second storage capacity and a second thickness made from a second insertion material. The thicknesses are such that the ratio of the first storage capacity over the second storage capacity is greater than or equal to 10 and lower than or equal to 1000. During the first charging of the micro-battery, the $Li^+$ ions are inserted in the negative electrode and completely saturate the second insertion material. When initial charging is continued, they form a metallic lithium layer between the electrolyte and the lithium-saturated negative electrode by electroplating. During the subsequent charging and discharging cycles, only the metallic lithium layer participates in transfer of lithium ions.

3 Claims, 3 Drawing Sheets

METHOD OF OPERATING A NON-BALANCED LITHIUM-ION MICROBATTERY

BACKGROUND OF THE INVENTION

The invention relates to a lithium-ion microbattery comprising a positive electrode having a first storage capacity and a first thickness made from a first lithium insertion material, and a negative electrode having a second storage capacity and a second thickness made from a second material lithium insertion material different from the first material.

STATE OF THE ART

Thin-film lithium microbatteries are generally formed by two electrodes (positive and negative) separated by an electrolyte. Such a microbattery further comprises metallic current collectors made from platinum or tungsten for example. All the layers of the microbattery are in the form of thin films obtained by PVD (Physical Vapor Deposition) or CVD (Chemical Vapor Deposition). The total thickness of the stack with the packaging layers is about 15 μm.

The positive electrode is generally made from a lithium insertion material. Certain insertion materials, lithiated metal oxides for example ($LiCoO_2$, $LiNiO_2$, $LiMn_2O_4$ etc), require thermal annealing in order to enhance crystallization of the films and their $Li^+$ ion insertion capacity. Other materials, such as amorphous materials, do not require such a treatment and already benefit from a high insertion rate, in particular titanium oxysulfide called TiOS. The electrolyte is an electric insulator with a high ionic conductivity such as LiPON. Several categories of microbattery involving $Li^+$ ions exist, depending on the nature of the negative electrode.

Microbatteries comprising a metallic lithium negative electrode constitute a first category called lithium-metal. The operating principle is based on insertion-extraction (or intercalation-deintercalation) of a $Li^+$ ion in the positive electrode. This insertion-extraction process generally gives rise to $Li^+$ ion losses due among other things to irreversible insertion of $Li^+$ ions in the positive electrode or to oxidation, for example because of defective packaging. The lost $Li^+$ ions no longer participate in the electrochemical reactions. In lithium-metal microbatteries, the metallic lithium, generally in excess, provides an additional provision of $Li^+$ ions which compensates these losses. The charging and discharging capacities therefore remain at a stable level throughout the charging/discharging cycles.

This type of microbattery presents the best electrochemical properties in particular in terms of potential and stability of the charging and discharging capacity. Lithium-metal microbatteries are however difficult to fabricate. The presence of metallic lithium does in fact make the usual microfabrication techniques and certain packaging steps unsuitable, in particular the solder reflow process which is performed at a higher temperature than the melting temperature of metallic lithium.

Unlike the negative electrode of a lithium-metal microbattery, the negative electrode of a lithium-ion (or Li-ion) microbattery comprises an insertion material and lithium. The $Li^+$ cations go back and forth between the negative and positive electrodes at each charging and discharging of the microbattery. The negative electrode material is chosen for example from oxides of insertion materials such as $LiNiO_2$, SnO, indium and lead oxide, or crystal growth materials (Si, Ge, C, etc). This category of microbattery enables the usual microfabrication techniques to be used, but generally presents lower electrochemical performances on cycling.

The article "Characterization of tin oxide/$LiMn_2O_2$ thin-film cell" (Journal of Power Sources 88, pp. 250-304, 254, 2000) describes an example of a lithium-ion microbattery with positive and negative electrodes respectively made from $LiMn_2O_4$ and tin oxide ($SnO_2$). The article highlights the loss of capacity of such a microbattery in the absence of an excess of lithium subsequent to an irreversibility of insertion during the first cycle.

Lithium-ion microbatteries therefore often require balancing of the anode and cathode materials to limit this loss of capacity which may prove delicate. What is meant by balancing is having the same storage capacity or insertion capacity of the $Li^+$ ions in each electrode.

The article "Lithium-Free Thin Film Battery With In Situ Plated Li Anode" (Journal of The Electrochemical Society, 147(2), pp. 517-523, 2000) describes a third type of microbattery commonly called lithium-free microbattery. This microbattery comprises a metallic current collector as negative electrode. During a first charge, the $Li^+$ ions migrate from the positive electrode and are blocked by the current collector which is for example made from copper. The $Li^+$ ions form a layer of metallic lithium on the current collector by electroplating. The battery then behaves in the same way as a lithium-metal battery with a low capacity loss at the first cycle.

Nevertheless, lithium-free microbatteries present a drop in their electrochemical cyclical performances. Electroplating of the lithium on the collector at each cycle does in fact foster stresses and fatigue of the stack layers by creating new volumes. Weakening pass-through lithium dendrites form in the electrolyte leading to short-circuits in the microbattery.

The document WO00/60689 describes a lithium-free microbattery. The metallic lithium anode is formed in situ by electroplating on a lithium-saturated carbon current collector during an activation charge of the microbattery.

In this type of microbattery, the lithium inserted in the collector and the lithium plated on the collector participate in the following charging and discharging cycles. These repeated insertions-extractions cause mechanical fatigue of the material forming the current collector. The material deteriorates resulting in progressive reduction of the performances of the microbattery, in particular of its charging and discharging capacity.

OBJECT OF THE INVENTION

The object of the invention is to provide an operating method of a lithium-ion microbattery enabling excellent electrochemical performances comparable to those of lithium-metal microbatteries to be obtained, while at the same time being chemically stable.

According to the invention, this object is achieved by the fact that, a lithium-ion microbattery comprising:
  a positive electrode having a first storage capacity of lithium ions and a first thickness made from a first lithium insertion material,
  an electrolyte, and
  a negative electrode having a second storage capacity of lithium ions and a second thickness made from a second lithium insertion material different from the first material, the first and second thicknesses being chosen such that the ratio of the first storage capacity over the second storage capacity is greater than or equal to 10 and lower than or equal to 1000,
the operating method of the microbattery comprises the following steps:

a first charge of the microbattery to transfer, from the positive electrode to the negative electrode, a first quantity of lithium until saturation of the negative electrode is reached and a second quantity of lithium until a metallic lithium layer is formed between the electrolyte and the lithium-saturated negative electrode, subsequent discharges and charges by transfer between the positive electrode and the negative electrode only of the second quantity of lithium deposited in the form of the metallic lithium layer.

BRIEF DESCRIPTION OF THE DRAWINGS

Other advantages and features will become more clearly apparent from the following description of particular embodiments of the invention given for non-restrictive example purposes only and represented in the accompanying drawings, in which.

DESCRIPTION OF PARTICULAR EMBODIMENTS

The microbattery comprises a positive electrode with a thickness $t_1$ made from a first lithium insertion material and a negative electrode with a thickness $t_2$ made from a second lithium insertion material, different from the first material.

Furthermore, the electrodes are greatly unbalanced in terms of $Li^+$ ion storage capacity, i.e. the negative electrode can store the $Li^+$ ions within its structure in a substantially smaller quantity compared with the positive electrode. The $Li^+$ ion storage capacity of the positive electrode is thus greater than the storage capacity $C_2$ of the negative electrode.

During the first charging of such a microbattery, the $Li^+$ ions migrate from the positive electrode to the negative electrode to be inserted therein until saturation occurs. This saturation takes place rapidly due to the low $Li^+$ ion insertion capacity of the negative electrode. When the initial charging is continued, the $Li^+$ ions can no longer be inserted in the material constituting the negative electrode and therefore form a metallic lithium deposit at the surface of the negative electrode, on the same side as the electrolyte. When the next cycles are performed, the layer formed by this metallic lithium deposit behaves as a new negative electrode of the microbattery.

In an example embodiment, the positive electrode is made from lithiated titanium oxysulfide ($Li_xTiOS$). The electrolyte is conventionally made from lithiated phosphate oxynitride (UPON). The negative electrode initially comprises a silicon layer. The table below gives the normalized storage capacities with respect to the surface (in $cm^2$) and the thickness (in μm) of the electrodes in the two materials mentioned above, and also gives the associated potential ranges:

| Insertion material | Potential range (V) | Normalized capacity ($\mu Ah \cdot cm^{-2} \cdot \mu m^{-1}$) |
|---|---|---|
| $Li_xTiOS$ | 1-3 | 80 |
| Si | 0-1 | 400 |

Figure 1:
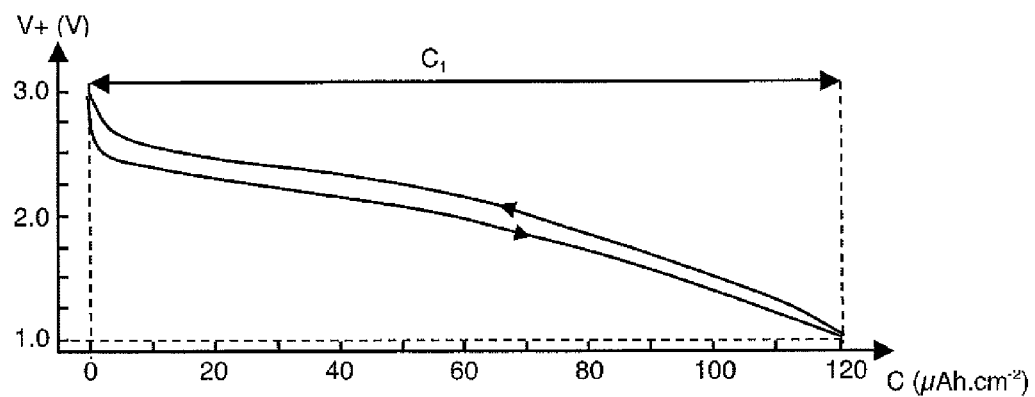
FIGS. 1 and 2 respectively represent the potential V+ of the $Li_xTiOS$ positive electrode and the potential V− of the Si negative electrode versus the capacity C of a microbattery operating according to the prior art.
Figure 2:
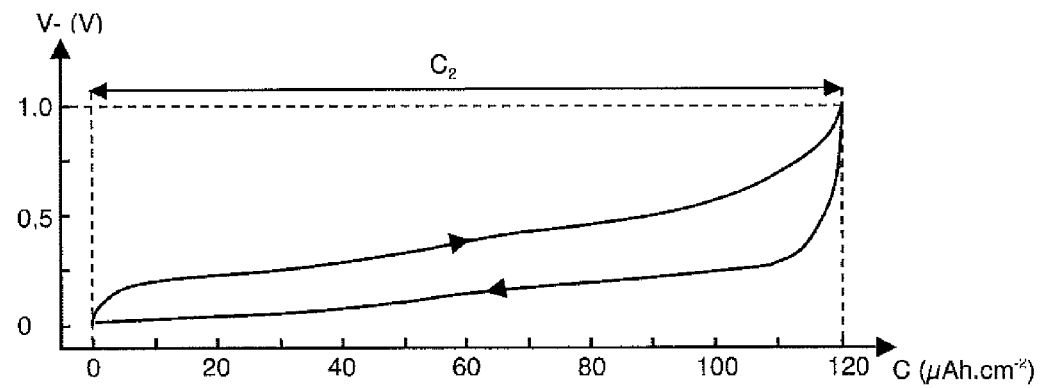

As illustrated in FIGS. 1 and 2, in a conventional lithium-ion microbattery configuration, the electrodes are balanced, that is to say their $Li^+$ ion storage capacities are substantially equal ($C_1 \approx C_2$). For example, for a microbattery with a capacity of about 120 $\mu Ah \cdot cm^{-2}$, the $Li_xTiOS$ positive electrode and the Si negative electrode would respectively present a thickness of 1.5 μm and 0.3 μm. The product of the normalized capacity and of the thickness for each electrode corresponds to the $Li^+$ ion storage capacity ($C_1$ or $C_2$) and therefore to the capacity of the battery. In this case, we obtain $C_1 = C_2 = 120 \mu Ah \cdot cm^{-2}$.

During full charging of such a microbattery, the electrodes being balanced, all the $Li^+$ ions (quantity X) migrate from the $Li_xTiOS$ positive electrode to the Si negative electrode to be inserted in the latter:

$$Li_xTiOS \rightarrow Li_xSi$$

The potential V+ of the positive electrode, represented in FIG. 1, increases from 1V to 3V compared with the reference potential of the $Li^+/Li$ pair. In the opposite manner, the potential V− of the negative electrode, represented in FIG. 2, decreases from 1V to 0V compared with the reference potential $Li^+/Li$, as the $Li^+$ ions are progressively inserted therein.

During discharging of the microbattery, the X $Li^+$ ions migrate in the opposite direction to that of charging:

$$Li_xSi \rightarrow Li_xTiOS$$

The potential of the positive electrode (FIG. 1) then decreases from 3V to 1V compared with the reference potential $Li^+/Li$. In the opposite manner, the potential of the negative electrode (FIG. 2) increases from 0V to 1V compared with the reference potential $Li^+/Li$.

Figure 5:
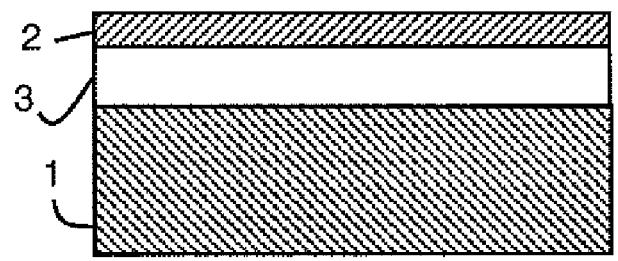
FIGS. 5 to 7 schematically represent steps of a method for fabricating a lithium battery according to the invention

The microbattery according to the invention initially (before any charging) comprises a positive electrode 1 and a negative electrode 2 that are not balanced in terms of storage capacity and an electrolyte 3 arranged between electrodes 1 and 2 (FIG. 5). The thicknesses $t_1$ and $t_2$ of the electrodes are such that the capacity $C_1$ of the positive electrode is greater than the capacity $C_2$ of the negative electrode, taking into account their respective thicknesses and the nature of the materials used, i.e. their respective normalized capacities. The ratio $C_1/C_2$ is therefore greater than 1 and lower than or equal to 1000. The ratio $C_1/C_2$ is preferably greater than or equal to 10 and lower than or equal to 100.

With non-balanced electrodes, the storage capacities $C_1$ and $C_2$ are unequal. For example for a microbattery with a capacity of about 120 $\mu Ah \cdot cm^{-2}$, $Li_xTiOS$ positive electrode 1 and Si negative electrode 2 respectively have a thickness of 2 μm and 0.1 μm. Capacity $C_1$ is then equal to 160 $\mu Ah \cdot cm^{-2}$ and capacity $C_2$ is equal to 40 $\mu Ah \cdot cm^{-2}$. Ratio $C_1/C_2$ is therefore equal to 4.

Figure 3:
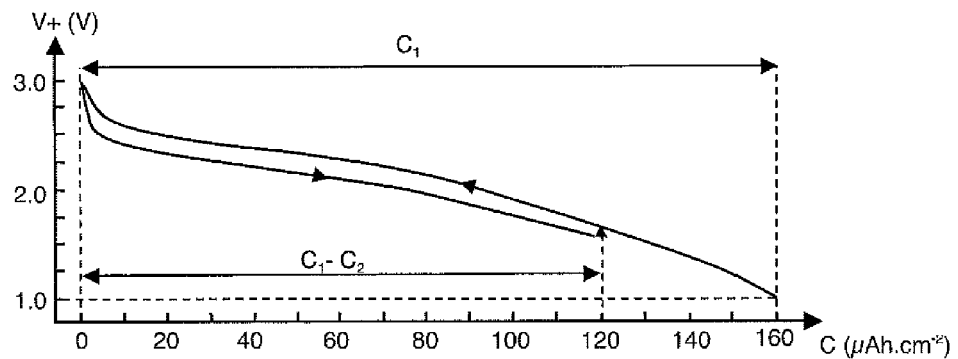
FIGS. 3 and 4 respectively represent the potential V+ of the $Li_xTiOS$ positive electrode and the potential V− of the Si negative electrode versus the capacity C of a microbattery according to the invention.
Figure 4:
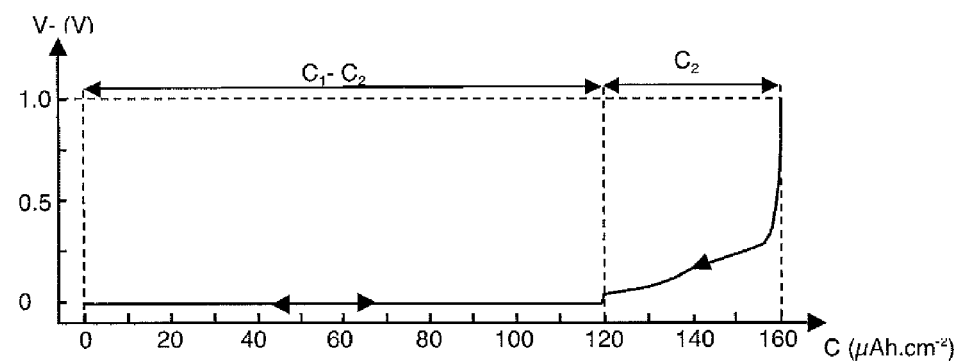
Figure 6:
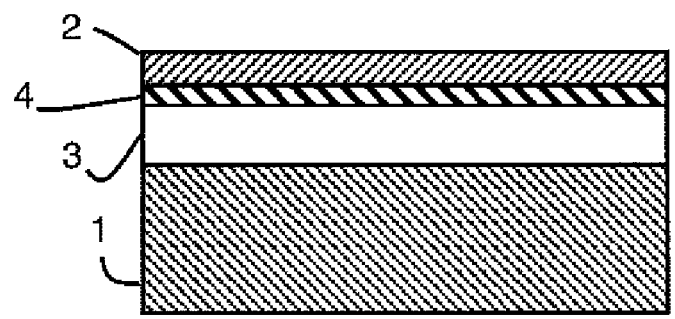

As illustrated in FIGS. 3, 4 and 6, during charging of a non-balanced microbattery, all the $Li^+$ ions, in quantity $X = X_1 + X_2$ equivalent to a storage capacity $C_1 = 160 \mu Ah \cdot cm^{-2}$, migrate from the $Li_xTiOS$ positive electrode 1. A part, in quantity $X_1$ equivalent to a storage capacity $C_2 = 40 \mu Ah \cdot cm^{-2}$, is inserted in the silicon negative electrode 2 until saturation ($Li_{X1}Si$) of the latter occurs. The second part of the $Li^+$ ions, in quantity $X_2$ equivalent to a storage capacity $C_1 - C_2 = 120$ μAh·cm$^{-2}$, forms a metallic lithium layer 4 between electrolyte 3 and negative electrode 2 by electroplating:

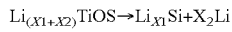

Quantity $X_1$ is therefore much lower than $X_2$ on account of the low storage capacity of the negative electrode. The potential V+ of the positive electrode increases from 1V to 3V compared with the reference potential of the Li$^+$/Li pair. In the opposite manner, the potential V− of the negative electrode decreases from 1V to 0V compared with the reference potential of the Li$^+$/Li pair, as the Li$^+$ ions are progressively inserted until saturation occurs.

Charging continues until all the Li$^+$ ions have been transferred from positive electrode 1 to negative electrode 2 thereby forming metallic lithium layer 4.

During discharging of the microbattery, only the Li$^+$ ions that are deposited in the form of a layer 4 of metallic lithium participate in the process and migrate in the opposite direction:

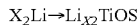

The potential of the positive electrode (FIG. 3) then decreases from 3V to 1.7V compared with the reference potential of the Li$^+$/Li pair. This potential does not revert to 1 as the Li$_x$TiOS does not recover the initial quantity $X_1+X_2$ of Li$^+$ ions. Furthermore the potential of the negative electrode (Li$_{X1}$Si) is not changed as the lithium is inserted definitively in the silicon. It therefore remains at 0 (FIG. 4).

According to this mode of operation, the lithium contained in the Li$_{X1}$Si negative electrode is never extracted when discharging takes place, unlike lithium-free microbatteries of the prior art. After it has been charged a first time, the microbattery therefore behaves only as a Li-metal microbattery and does not revert to its initial state. Mechanical fatigue of the silicon can therefore be prevented.

End of discharge of the microbattery can be controlled by the voltage at the microbattery terminals. As soon as the voltage reaches a limit value corresponding to the beginning of lithium extraction from the negative electrode, discharging is interrupted. Transfer of lithium is thus limited to the metallic lithium layer. This threshold value is preset according to the nature of the electrodes, in particular to their lithium ion storage capacities. In the example of FIGS. 3 and 4, the threshold has a value of 1.7 V.

Figure 7:
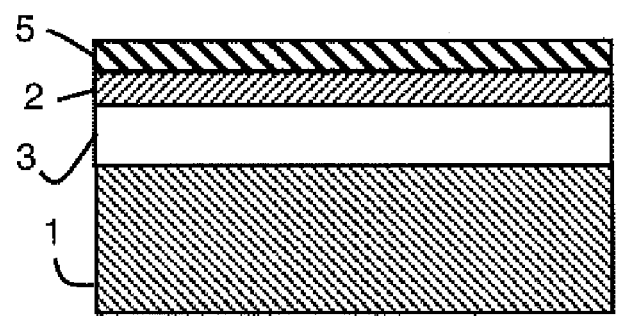

In an alternative embodiment illustrated in FIG. 7, the microbattery in a first stage comprises a positive electrode 1 made from an initial non-lithiated material, for example TiOS. A metallic lithium layer 5 is then deposited on the free external surface of the negative electrode 2, i.e. on the top surface. This layer 5 constitutes the lithium provision of the microbattery and the quantity of lithium deposited is equal to the quantity of lithium able to be stored by positive electrode 1. This quantity is therefore equivalent to the Li$^+$ ion insertion capacity of the TiOS positive electrode. Positive electrode 1 and metallic lithium layer 5 are then short-circuited. The Li$^+$ ions of layer 5 are then totally inserted in the insertion material (TiOS) initially constituting positive electrode 1 to form the lithiated material of the positive electrode (LiTiOS). The microbattery obtained in this way is identical to that of FIG. 5 and is ready for initial charging as described in the foregoing.

It should be noted that, in the above-mentioned article "Characterization of tin oxide/LiMn$_2$O$_2$ thin-film cell", Park suggests that an imbalance between the two insertion electrodes of a lithium-ion microbattery is generally detrimental to satisfactory operation of the device.

However, under the imbalance conditions set out above, the lithium microbattery, comprising formation of metallic lithium on the lithium-saturated negative electrode, presents good electrochemical performances, in particular a stability of the capacity during cycling. These performances are due to the presence of metallic lithium at the surface of the negative electrode and are comparable to those of lithium-metal microbatteries.

The thin layer of silicon of the negative electrode acts as insertion layer in a first stage and then as germination and growth layer when electroplating of the metallic lithium takes place. Growth thus seems to take place homogeneously, thereby preventing any formation of dendrites liable to cause malfunctioning of the microbattery.

Furthermore, the use of this type of configuration circumvents any irreversibility of insertion that may take place in the negative electrode. The lithium that is inserted in the negative electrode in the course of the first charging does not in fact play any role in the subsequent charging-discharging cycles.

Fabrication of the microbattery further circumvents the balancing step of the positive and negative electrodes, a step that is necessary and often critical in fabrication of conventional Li-ion microbatteries.

The initial structure of the microbattery, before the first charging forming the metallic lithium layer, enables fabrication using the usual microfabrication techniques. The insertion materials used (lithiated TiOS and Si for example) are in fact compatible with these techniques, in particular with heat treatment performed above the melting temperature of metallic lithium.

Finally, the potential delivered by such a microbattery varies in continuous and monotonous manner. Integration of the microbattery in a global electronic system and monitoring of its state of charge are then facilitated.

The values of capacities, potentials and thicknesses of the electrodes are given in the above for example purposes. In particular, the positive electrode material can be chosen from other lithiated insertion materials, for example LiCoO$_2$, LiMn$_2$O$_4$, LiV$_2$O$_5$ etc. The negative electrode material can be chosen from crystal growth materials Ge, SiGe, C and so on. The thicknesses of the electrodes can vary from 100 nm to 10 μm for the positive electrode and from 5 nm to 1 μm for the negative electrode. The thickness of the positive electrode will preferably be comprised between 1 and 5 μm and the thickness of the negative electrode between 10 nm and 400 nm.

The invention claimed is:

1. Operating method of a lithium-ion microbattery comprising:
    a positive electrode having a first storage capacity of lithium ions and a first thickness made from a first lithium insertion material,
    an electrolyte, and
    a negative electrode having a second storage capacity of lithium ions and a second thickness made from a second lithium insertion material different from the first material, the first and second thicknesses being chosen such that the ratio of the first storage capacity over the second storage capacity is greater than or equal to 10 and lower than or equal to 1000,
    the method comprising the following steps:
    a first charge of the microbattery to transfer, from the positive electrode to the negative electrode, a first quantity of lithium until saturation of the negative electrode is reached and a second quantity of lithium until a metallic lithium layer is formed between the electrolyte and the lithium-saturated negative electrode, subsequent discharges and charges by transfer between the positive electrode and the negative electrode only of the second quantity of lithium deposited in the form of the metallic lithium layer.

2. Method according to claim 1, wherein discharges of the microbattery are interrupted when the voltage at the terminals of the microbattery reaches a threshold value.

3. Method according to claim 1, initially comprising short-circuiting of the positive electrode initially formed by a non-lithiated material and of a metallic lithium layer arranged on a free external surface of the negative electrode to form the material of the positive electrode.

* * * * *